UNITED STATES PATENT OFFICE.

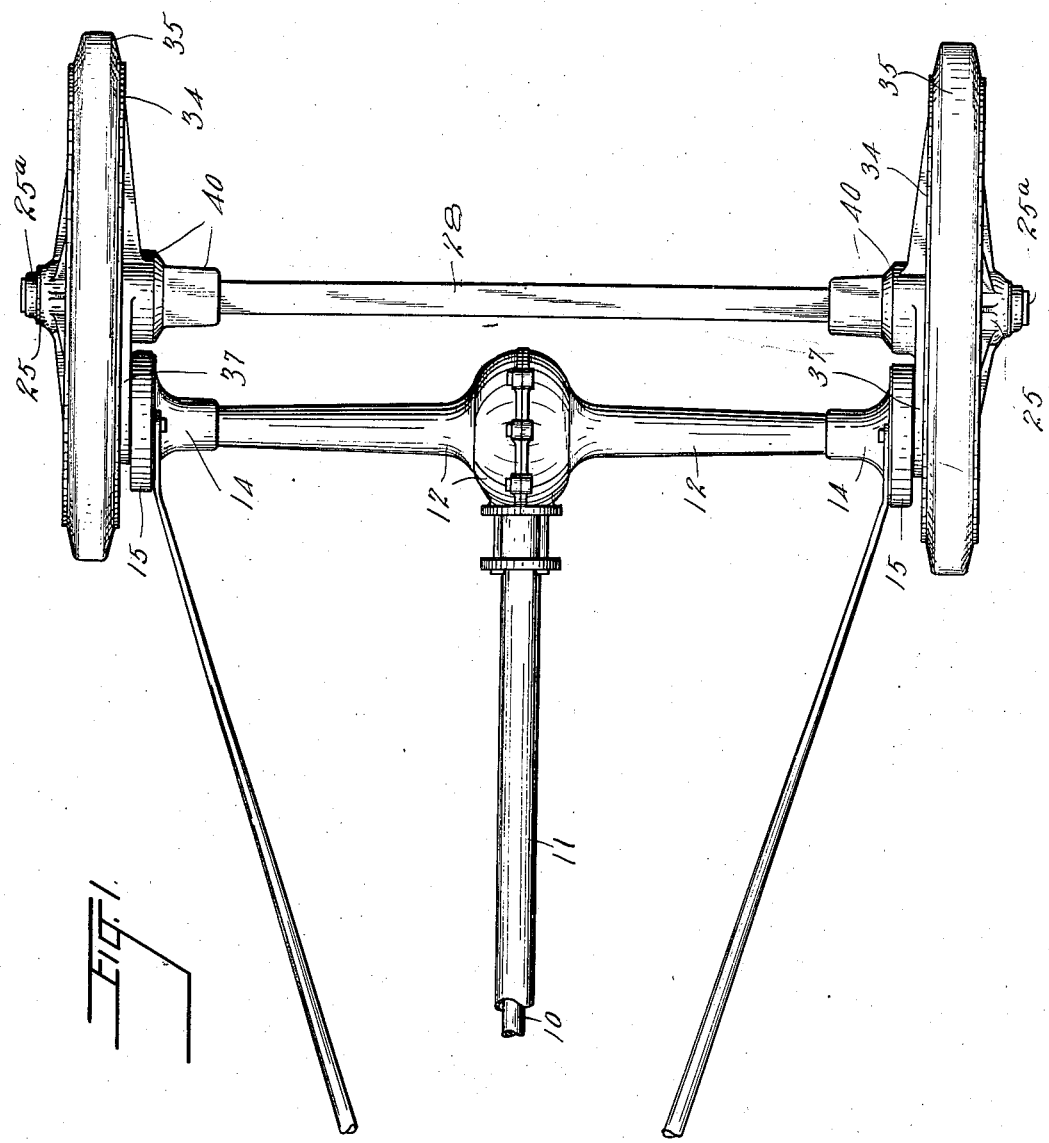

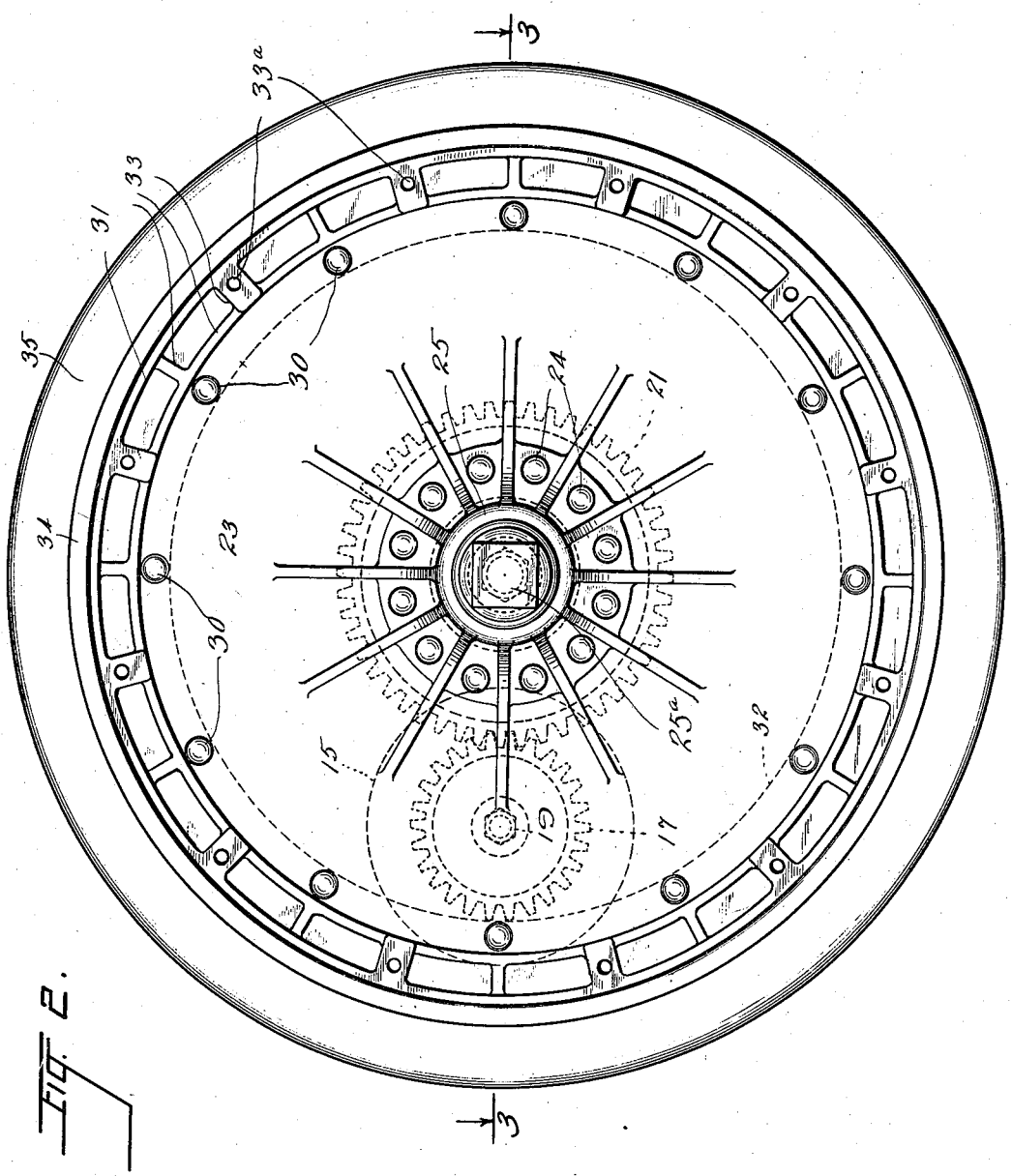

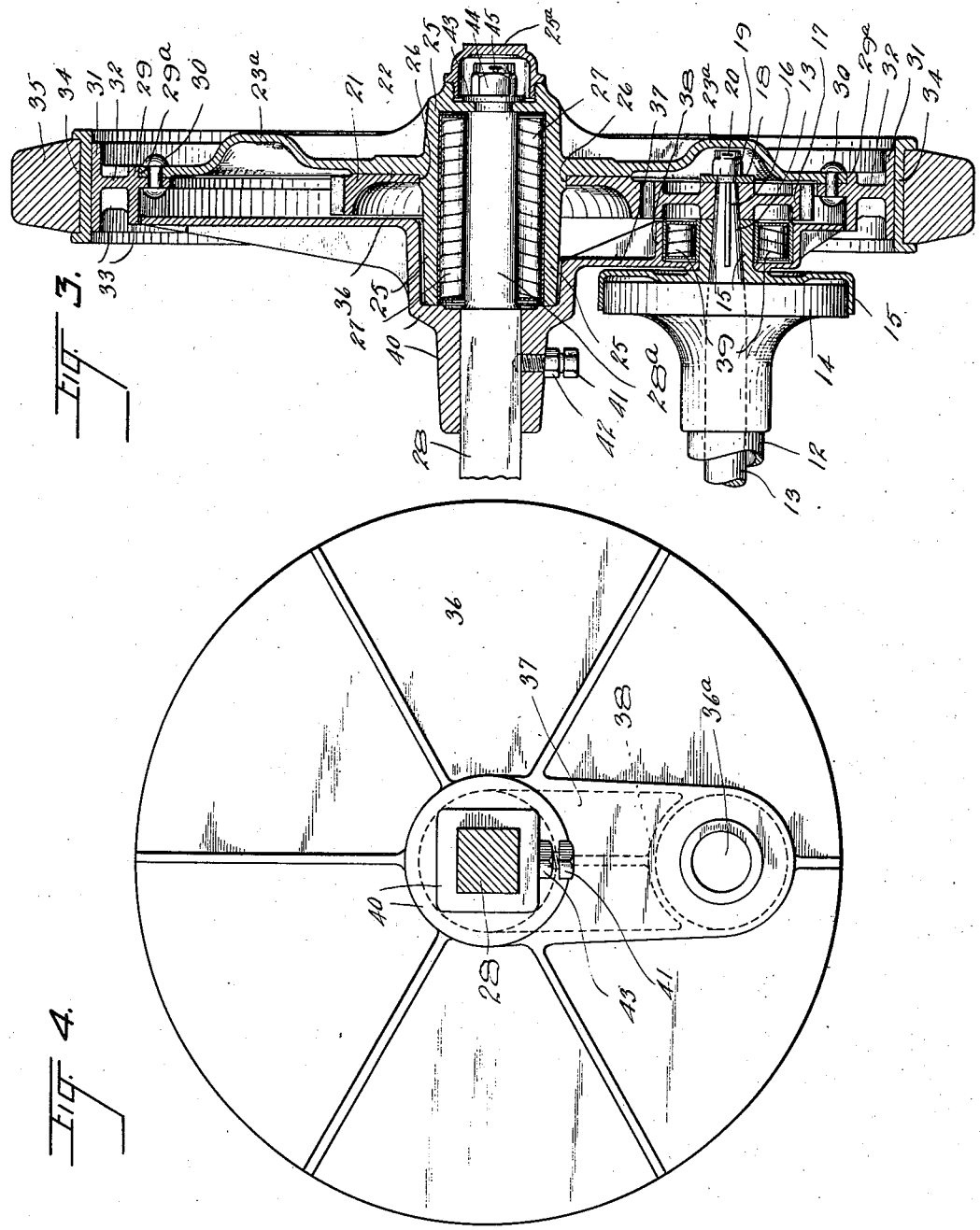

GEORGE H. IRWIN AND DANIEL D. SWEM, OF CHICAGO, ILLINOIS, ASSIGNORS TO MAKE-A-MOTOR TRUCK COMPANY, OF WILMINGTON, DELAWARE, A CORPORATION OF DELAWARE.

TRUCK ATTACHMENT FOR MOTOR-VEHICLES.

1,204,572. Specification of Letters Patent. Patented Nov. 14, 1916.

Application filed March 21, 1916. Serial No. 85,687.

*To all whom it may concern:*

Be it known that we, GEORGE H. IRWIN and DANIEL D. SWEM, citizens of the United States, residing at Chicago, in the county of Cook and State of Illinois, have invented certain new and useful Improvements in Truck Attachments for Motor-Vehicles, of which the following is a specification.

This invention relates to improvements in truck attachments for motor vehicles.

It consists of a combination of parts to be used in conjunction with motor driven vehicles, after having eliminated certain parts which are common to motor vehicle construction and substituting the invention hereinafter described.

The objects of the invention are to provide an auxiliary rear axle and specially designed wheels; a combination of gears constructed and adapted for use with specially designed rear wheels and used in combination with the rear axle construction as provided in various types of motor driven vehicles.

The invention hereinafter described is shown in combination with a motor vehicle of a common type and provides means adapted to motor vehicles of similar constructive principle without alteration of principle involved in the said invention.

Referring to the accompanying drawings which form a part of this specification, similar numerals refer to similar parts throughout the various views.

Figure 1, is a top plan view of the invention in elevation and shown in combination with the rear end portion of a motor vehicle. Fig. 2, is a side elevation of a wheel and related parts which form elements of the invention. Fig. 3, is a sectional view taken on line 3—3 of Fig. 2. Fig. 4, is a view in elevation of an element embodied in the invention.

In referring to the various parts disclosed in the drawings the numeral 10 indicates a motor propelled shaft and 11 is a housing for said shaft. 12 is a differential and rear axle housing. 13 is a rear axle and 14 a brake all of which are parts common to motor vehicle construction and which form no part of this invention; but are used in combination with the elements of the invention as follows: 15 is a brake drum disposed on the rear axle 13 and is secured by a key member 16. 17 is a spur gear pinion likewise secured on rear axle 13 by key 16. 18 is a washer and 19 is a retaining nut locked with a key pin 20. Collectively, the said parts are secured to and will rotate with rear axle section 13 when power is applied to the motor propelled shaft 10 and communicated through the differential which is common to motor vehicle construction, to the rear axle section 13 of which there are two in number,—one for each rear wheel. These rear axle sections are known to the automobile trade as jack shafts. It should be noted that the parts referred to, 16, 17, 18, 19 and 20, are located on axle 13. The rear wheels are eliminated and the above mentioned parts substituted.

The teeth of the spur gear pinion 17 intermesh with corresponding teeth on a gear 21. The latter gear 21 is provided with a web 22 which is provided with holes which match similar holes in the circular wheel body or member 23 and admit the rivet members 24 which secure the gear 21 and the wheel member 23 rigidly together. A hub 25 is provided on wheel body 23 and the said hub is provided with an annular fixed bearing portion 26 to receive the inner periphery of the web 22 of the gear 21.

$25^a$ is a screw hub cap.

27 is a roller bearing of a well known type and is retained in the hub 25.

28 is an axle herein known as an auxiliary axle and is provided to receive the burden that would in ordinary construction be carried by axles 13. The auxiliary axle 28 is non-rotatable and is therefore provided at either end with a spindle as indicated by numeral $28^a$ and suitable for operation of roller bearing 27 which is caused to rotate on the circumferential surface of the said spindle $28^a$ in conjunction with the substituted wheel.

The body 23 comprises a circular web or disk and is provided with an annular bulged portion $23^a$ to give clearance for the outer ends of the axle sections 13. Near the outer periphery of member 23 holes are provided to correspondingly match similar holes in a rim or felly member 29, and rivets 30 are provided to secure member 23 and member 29 rigidly together. The body 23 also has a peripheral bearing on the member 29 as at $29^a$. Rim member 29 has an annular peripheral flange 31 which extends at right angles from a web portion 32. Reinforcing ribs 33 are provided on the rim member and holes 33ª are provided for applying a demountable tire (not disclosed in the drawings) if desired.

34 is a tire rim and 35 a solid tire both being common to wheel construction and known as the pressed on type. Each wheel is faced or housed on the inner side by a circular plate 36 having lateral reinforcing ribs and an extended casing portion as at 37. A lateral circular rib 38 is provided on the inner surface of said casing to receive a roller bearing 39. The said roller bearing is provided for the rotatable brake drum 15 and the aperture 36ª is provided to receive the hub of said member 15. A hub portion 40 is provided to receive the auxiliary axle 28 and to which it is secured rigidly by means of a screw 41 having a lock nut 42.

43 is a washer, 44 is a retaining nut, and 45 is a key pin to hold the wheel on the axle spindle.

It will be seen that this construction provides two axles at the rear of the machine, one the ordinary driving axle, and the other a carrying axle adapted to support the weight of a truck body, and wheels are provided on the carrying axle, which wheels are geared to and driven by the driving axle sections. Since the wheels are loose on the auxiliary axle, the ordinary differential serves to permit differential movement of the wheels. The weight is taken off of the driving axle, and the reducing gear gives a relative increase in power, the ordinary axle serving a driving function solely. The ease with which the attachment may be applied to the ordinary running gear is obvious. Although illustrated in connection with a machine of the Ford type, the attachment is capable of application to other machines. The relatively rigid connection afforded between the driving axle casing and the auxiliary axle, is an important feature of the invention, as well as the ease with which the attachment may be applied, without modification of the existing running and driving gear, and the close-up construction does not detract from a favorable appearance of the truck as a whole, and enables the rear part of the original machine to be utilized for body purposes, instead of having the appearance of a towed truck, the entire transmitting gearing being included or inclosed within the outline of the substituted wheels.

The invention is not limited to the exact embodiment shown, but the construction may be modified in various ways within the scope of the invention.

It should be mentioned that in order to drive the wheels 23 forwardly on the direct drive the ordinary driving or differential shaft has to be turned over as a whole, to reverse its usual direction of rotation.

What we claim is:

1. In a motor vehicle, the combination of a rear axle casing having brake members thereon, a driving axle in the casing, brake drums mounted on said axle and rotating therewith, an auxiliary axle, wheels rotatable thereon, casings secured to the fixed axle, bearings between the brake drums and said casings and supporting said drums and driving axle, and gearing between the driving axle and the wheels.

2. In a motor vehicle, the combination of a rear axle casing having brake members thereon, a driving axle in the casing, brake drums secured to said axle, and having projecting hubs, a carrying axle, wheels rotatable thereon, casings mounted on the carrying axle and having openings through which the said hubs project, bearings between said hubs and the casing, and gearing between the driving axle and the wheels.

3. In a motor vehicle, the combination with a rear driving axle structure, of an auxiliary axle, wheels rotatable thereon, a gear on each wheel, a gear on each end of the driving axle, in mesh with said gear, and a recessed casing on each end of the auxiliary axle, said casing having an annular flange, and bearings between said flange and the end of the driving axle.

4. In a motor vehicle, the combination with a rear driving axle and its casing, the ends of the axle projecting beyond the casing, of an auxiliary axle, wheels rotatable thereon, each having a body with an annular channel into which an end of the driving axle projects, a gear on each wheel, a gear on each end of the driving axle, in mesh with said gear, and face plates on the auxiliary axle, inclosing said gears and having openings through which the ends of the driving axle extends.

In testimony whereof, we affix our signatures in presence of two witnesses.

GEORGE H. IRWIN.
DANIEL D. SWEM.

Witnesses:
L. B. GARRISON,
W. B. INGURD, Sen.